(No Model.)

J. F. POOL.
POULTRY NEST.

No. 579,407.   Patented Mar. 23, 1897.

Witnesses
Franck L. Durand
W. S. Boyd

Inventor
James F. Pool.
By E. B. Whitmore
Attorney

UNITED STATES PATENT OFFICE.

JAMES F. POOL, OF ROCHESTER, NEW YORK.

POULTRY-NEST.

SPECIFICATION forming part of Letters Patent No. 579,407, dated March 23, 1897.

Application filed June 13, 1896. Serial No. 595,492. (No model.)

*To all whom it may concern:*

Be it known that I, JAMES F. POOL, of Rochester, in the county of Monroe and State of New York, have invented a new and useful Improvement in Poultry-Nests, which improvement is fully set forth in the following specification and shown in the accompanying drawings.

My invention relates to nests for domestic fowls, more particularly for the use of hens; and the main object of the invention is to produce a construction of nest by the use of which fowls will be prevented from pecking and eating the eggs.

The invention consists in an inclosure or house, preferably box-shaped, provided with a floor concave or depressed at the center to form the nest proper and a second floor below the nest-floor with chamber between the floors and an opening at the bottom of the nest-floor through which the egg when deposited may descend into the chamber out of reach of the fowl.

The invention further consists in other novel features, all of which are hereinafter fully described and more particularly pointed out.

Figure 1:
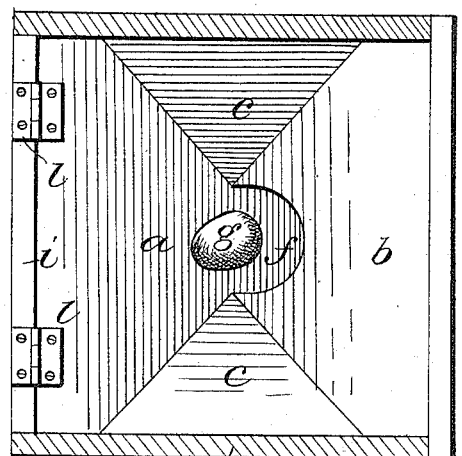
Figure 2:
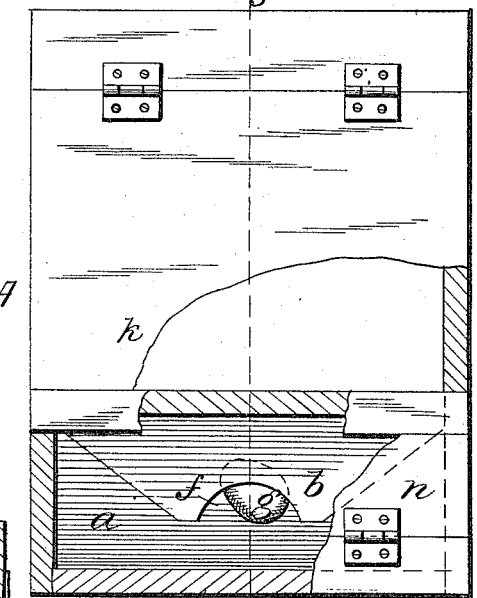
Figure 3:
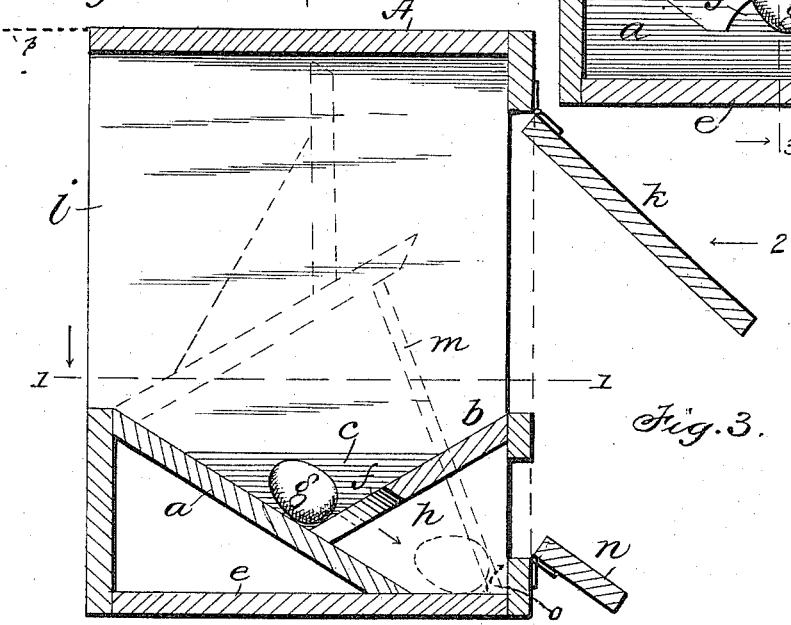
Figure 4:
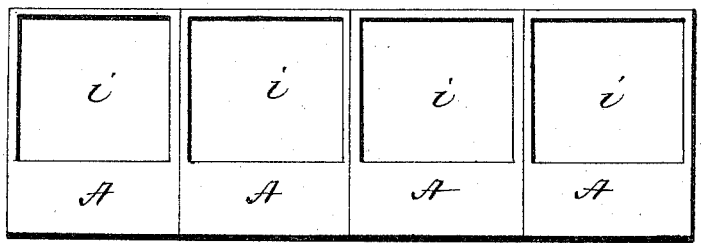

Referring to the drawings, Figure 1 is a horizontal section of the nest on the line 1 1 in Fig. 3. Fig. 2 is a front elevation, parts being broken away. Fig. 3 is a side elevation sectioned on the dotted line 3 3 in Fig. 2, parts being shown in two positions by full and dotted lines. Fig. 4, drawn to a smaller scale, shows a number of the nests arranged side by side, as they are commonly used.

Referring to the drawings, A is a house or inclosure made of a size adapted to the use to which the nest is to be put. For hens the dimensions are preferably about twelve inches square on the ground and sixteen to eighteen inches high. Near the bottom of the inclosure is the nest proper, preferably made of four inclined strips of wood or sheets of metal $a\,b\,c\,c$, joined to form a concave or hollow seat for the fowl. At their outer edges these strips or sheets are contiguous with the respective inner surfaces of the four walls of the house, forming a floor therefor. The house is also formed with a lower horizontal rigid floor $e$. The part $a$ of the nest extends to the floor $e$, as appears in Figs. 2 and 3. The part $b$ is formed with an opening $f$ adjacent to the part $a$, adapted to allow the egg $g$ to pass through into the chamber $h$ between the floors, as indicated in Fig. 3.

The house or inclosure is formed with an opening $i$ at the rear side above the nest, through which the fowl may enter, and it is also formed with a door $n$, opening into the chamber $h$, through which to remove the eggs. Another door $k$ is also provided above the door $n$, to be opened for inspecting the nest and other purposes.

The hollow floor or nest is made movable and joined to the side of the inclosure at the bottom of the door $i$ by hinges $l\,l$, so that said floor may be elevated to the position indicated by dotted lines in Fig. 3. This is for the purpose of renovating the nest, and more particularly for closing it against the occupancy of the fowl when so desired. The nest-floor may be held in its elevated position by any convenient detent or holder, as a simple prop, (shown by dotted lines at $m$, Fig. 3.)

The upper surface of the nest-floor or nest proper may be upholstered or padded or otherwise covered with some suitable fibrous material, held to place by tacks or otherwise, if thought desirable. Also, a cushion or buffer $o$, Fig. 3, is provided to soften the descent of the egg when passing into the chamber $h$ along the inclined part $a$.

In use a number of these houses or nests are commonly placed side by side, as shown in Fig. 4, with the entrances $i$ turned toward a wall, partition, or some other similar object far enough away therefrom to form a passage between said object and the row of nests to allow the fowl to pass therein and enter any one of the latter it may choose. Also, this passage is preferably covered by a suitable covering or canopy, as shown in a dotted line $p$ in Fig. 3, to darken it to cater to the nest-hiding disposition of the fowl.

What I claim as my invention is—

In a poultry-nest, the combination, with a box, the front of which is provided with two openings and the rear with one opening, a door for each of the openings in the front, a nest pivotally secured to the rear portion at the bottom of the opening and having the front engaging with the front wall of the box intermediate the two openings, the bottom of the nest being provided with an opening and one of the sides being extended from the opening to the bottom of the box, substantially as set forth.

In witness whereof I have hereunto set my hand, this 10th day of June, 1896, in the presence of two subscribing witnesses.

JAMES F. POOL.

Witnesses:
ENOS B. WHITMORE,
M. L. WINSTON.